United States Patent
Andrikowich et al.

(10) Patent No.: US 8,089,721 B1
(45) Date of Patent: Jan. 3, 2012

(54) HERMETIC SEAL FOR DISCRETE OPENING IN DISK DRIVE HOUSING

(75) Inventors: Thomas G. Andrikowich, Whitinsville, MA (US); Michael C. Strzepa, Shrewsbury, MA (US); Bruce Gifford, Nashua, NH (US)

(73) Assignee: Seagate Technology LLC, Scotts Valley, CA (US)

( * ) Notice: Subject to any disclaimer, the term of this patent is extended or adjusted under 35 U.S.C. 154(b) by 859 days.

(21) Appl. No.: 11/561,791

(22) Filed: Nov. 20, 2006

Related U.S. Application Data (60) Provisional application No. 60/738,879, filed on Nov. 22, 2005.

(51) Int. Cl.
  *G11B 33/14* (2006.01)
  *H02K 7/00* (2006.01)
  *H02K 11/00* (2006.01)

(52) U.S. Cl. ............... 360/97.02; 310/67 R; 360/99.08

(58) Field of Classification Search ............... 360/97.01, 360/97.02, 97.03, 98.07, 99.08; 310/67 R, 310/71

See application file for complete search history.

(56) References Cited

U.S. PATENT DOCUMENTS

| | | | |
|---|---|---|---|
| 4,818,907 A * | 4/1989 | Shirotori ................... | 310/67 R |
| 5,143,459 A * | 9/1992 | Plutt ........................ | 384/537 |
| 5,187,621 A * | 2/1993 | Tacklind .................. | 360/97.02 |
| 5,422,766 A | 6/1995 | Hack et al. | |
| 5,454,157 A | 10/1995 | Ananth et al. | |
| 5,619,389 A * | 4/1997 | Dunfield et al. ........... | 360/98.07 |
| 6,392,838 B1 | 5/2002 | Hearn et al. | |
| 6,501,615 B1 * | 12/2002 | Kelsic et al. ............... | 360/97.02 |
| 6,811,157 B2 * | 11/2004 | Shinoda et al. .............. | 277/608 |
| 6,831,811 B1 | 12/2004 | Andrikowich et al. | |
| 6,970,322 B2 | 11/2005 | Bernett | |
| 7,016,145 B2 | 3/2006 | Gunderson et al. | |
| 2002/0153672 A1 | 10/2002 | Caplain et al. | |
| 2004/0066124 A1 * | 4/2004 | Kanao et al. .................. | 313/135 |

\* cited by examiner

*Primary Examiner* — Craig A. Renner
*Assistant Examiner* — Gustavo Polo
(74) *Attorney, Agent, or Firm* — Fellers, Snider, et al.

(57) ABSTRACT

A hermetic seal is provided for sealing a discrete opening in a disk drive base plate. The hermetic seal comprises a sealing gasket that is disposed between planar facing surfaces of a component inserted through the opening and a recess formed on the interior of the base plate. As the gasket is compressed, a deformable plating applied to the gasket deforms and flows to fill microscopic voids that may be found in the abutting planar surfaces. Required access to the disk drive through the opening may be made in a rework process without destroying the seal. To seal the opening of the drive again, the sealing gasket is simply recompressed between the planar abutting surfaces. The invention also comprises a method by which to seal the castings of the disk drive housing, to include the base plate and top cover the disk drive. The method generally includes a two-time resin impregnation process to fill exposed pores on the surface of the castings.

10 Claims, 5 Drawing Sheets

HERMETIC SEAL FOR DISCRETE OPENING IN DISK DRIVE HOUSING

CROSS REFERENCE TO RELATED APPLICATION

Priority is claimed from U.S. Provisional Patent Application No. 60/738,879, filed on Nov. 22, 2005, and entitled "HERMETIC SEAL FOR A DISCRETE SHAFT-HOUSING ASSEMBLY OR PIVOT", the disclosure of which is incorporated herein by reference in its entirety.

FIELD OF THE INVENTION

The present invention relates to low density gas-filled hard disk drives and, more particularly, to a hermetic seal for a discrete opening in a housing of a disk drive such as an opening to accommodate a spindle motor shaft or a head stack assembly of the disk drive to contain a pressurized gas environment in the disk drive.

BACKGROUND OF THE INVENTION

Hard disk drives incorporate magnetic storage disks and read/write heads that are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly that positions the heads relative to the surface of the storage disks. This may be at a predetermined height above the corresponding storage disk or, in some instances, in contact with the surface of the storage disk. The actuator assembly is typically positioned by a voice coil motor that acts to position the slider over a desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to a plurality of hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly narrower. However, decreasing the width of tracks makes it more difficult for the read/write heads to accurately read and write information to and from the narrowing tracks. Not only is it difficult to physically position the read/write element over a narrow width track, but it is increasingly difficult to maintain the read/write element over the track at an optimal position for accurate data transfer. Air turbulence created by the spinning disks, disk flutter and spindle vibrations, temperature and altitude can all adversely effect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations further increasing TMR. Higher rotational speeds can also increase spindle motor power and idle acoustics.

Accuracy can be further adversely affected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. Because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors, as well as air turbulence, disk flutter and spindle vibration, can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals or gaskets used in disk drives between the housing components, such as between the base plate and cover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

As an alternative to air-filled drives, advantages may be achieved by filling disk drives with gases having a lower density than air. For example, helium has a lower density than air at similar pressures and temperatures and can enhance drive performance. As used herein, a low density gas or a lower density gas means a gas having a density less than that of air. When compared with air, lower density gases can reduce aerodynamic drag experienced by spinning disks within the drive, thereby reducing power requirements for the spindle motor. A low density gas-filled drive thus uses less power than a comparable disk drive that operates in an air environment. Relatedly, the reduction in drag forces within the low density gas-filled drive reduces the amount of aerodynamic turbulence that is experienced by drive components such as the actuator arms, suspensions and read/write heads. Some low density gases also have greater thermal conductivity, which results in better motor efficiencies and therefore lower power consumption for a given performance level. Reduction in turbulence allows drives filled with low density gas to operate at higher speeds compared with air-filled drives, while maintaining the same flying height and thereby maintaining the same range of read/write errors. Low density gas-filled drives also allow for higher storage capacities through higher recording densities due to the fact that there is less turbulence within the drive which allows the tracks to be spaced more closely together.

Despite these advantages, low density gas-filled drives have not been commercially successful. Low density gas-filled drives, in order to function, must be effectively sealed over an acceptable lifetime of the drive. It has been difficult to prevent the low density gas from escaping from the sealed drive environment. Unlike air-filled drives, a port may not be used to equalize pressure outside and inside the drive. As a result, the seal between the cover and base plate must minimize or prevent leakage and maintain a threshold level of low density gas within the sealed environment over the expected lifetime of the drive. Conventional rubber seals used in air-filled drives are inadequate at preventing leakage of low density gas due to the smaller atom size of low density gases, such as helium, compared to air. The smaller helium atoms diffuse through the rubber seals, thereby reducing the volume of low density gas within the drive. Thus, over time, the necessary threshold quantity of low density gas may be lost within the drive environment and may or may not be replaced with ambient air. In either case, the performance of the drive will change from the design specifications, namely, a low density gas-filled sealed environment. As the low density gas leaks out of a drive and is replaced by air, the drive is subject to undesirable operational effects possibly leading to unacceptable error rates and/or failure of the drive. For example, the increased concentration of air may increase the turbulent forces on the heads due to the increased drag forces within the drive which may further cause the heads to fly at too great a distance above the disks and potentially increasing instances of read/write errors. If the low density gas leaks from the sealed environment over time and is not replaced by ambient air, problems will occur such as the heads flying at a distance too close or in contact with the disks, thereby increasing instances of read/write errors as well as damage to the disk surface and head and higher operating temperatures due to a reduction in conduction cooling. Each creates a reliability risk. The risk of unanticipated failures due to inadequate amounts of low density gas within the drive is a draw back to low density gas-filled drives. Indeed, data stored within the drive may be irretrievably lost if the drive fails due to the loss of the low density gas environment.

Low density gas-filled drives also must be designed to permit testing and rework, if necessary. Thus, the ability to seal openings in the base plate and/or cover plate on a temporary basis and on a long-term basis must exist. Such openings include, but are not limited to, openings for securing ends of the spindle and actuator shafts to the cover or base plate, or openings to permit self servo-writing. These openings must be adequately sealed to permit testing of the drive under normal conditions and, if possible, unsealed to permit rework. Thus, it is desirable to minimize waste and optimize efficiencies when sealing a disk drive housing to allow rework when needed. It is also desirable to seal openings through which electrical connections are made between components inside and outside the disk drive housing. One example of sealing an opening through which electrical connections are made is disclosed in co-pending application Ser. No. 10/839,606 entitled "METHOD FOR CONTROLLED FABRICATION OF HERMETICALLY SEALED PCB CONNECTOR", which is incorporated by reference herein in its entirety. Another example of sealing various types of openings in a disk drive is disclosed in co-pending application Ser. No. 10/839,685 entitled "SEAL-TYPE LABEL TO CONTAIN PRESSURIZED GAS ENVIRONMENT", which is also incorporated herein by reference in its entirety.

In addition to sealing the openings made in the disk drive base plate and top cover, the base plate and top cover themselves must be made impermeable to gas passage by treating these components. One solution for making these components impermeable to gas passage includes the co-pending application Ser. No. 10/839,608 entitled "PROCESS TO SEAL ALUMINUM DIE CASTINGS TO CONTAIN LOW DENSITY GAS", which is also incorporated herein by reference in its entirety. This application discloses a single or two-time resin impregnation to fill exposed pores on the surfaces of the castings that may otherwise allow gas passage through the die casting material. The two-time process begins with providing a low porosity casting material. The casting is cleaned and degreased. The casting is placed in a vacuum chamber to remove air from the pores in the casting. While under vacuum, a resin is applied to the casting. Pressure greater than or equal to one atmosphere is introduced to fill all of the surface pores and seal the casting. The casting is washed and subject to a curing process. The casting is then subjected to machining, if necessary, to bring it into specification compliance. The process is repeated for a second resin impregnation of the casting. The casting is then heated to finally seal the resin and to out-gas impurities. In the case of the single resin impregnation process, a fully machined low porosity casting is used at the start of the process flow.

SUMMARY OF THE INVENTION

Various embodiments of the present invention are generally directed to sealing an opening in a housing.

In accordance with various embodiments, a base plate adapted to form a housing of a data storage device has a first planar surface which concentrically surrounds an opening extending through the plate. A component extends through the opening and has a second planar surface facing the first planar surface. A plated sealing gasket is compressed between the first and second planar surfaces, the gasket having a first linear portion that abuts the first planar surface, a second linear portion that abuts the second planar surface and is offset in a non-overlapping radial relation to the first linear portion, and a linear frusto-conical portion that projects from the respective first and second linear portions at a common obtuse angle.

These and other features and advantages of the various embodiments can be understood from a review of the following detailed description and associated drawings.

DETAILED DESCRIPTION

Figure 1:
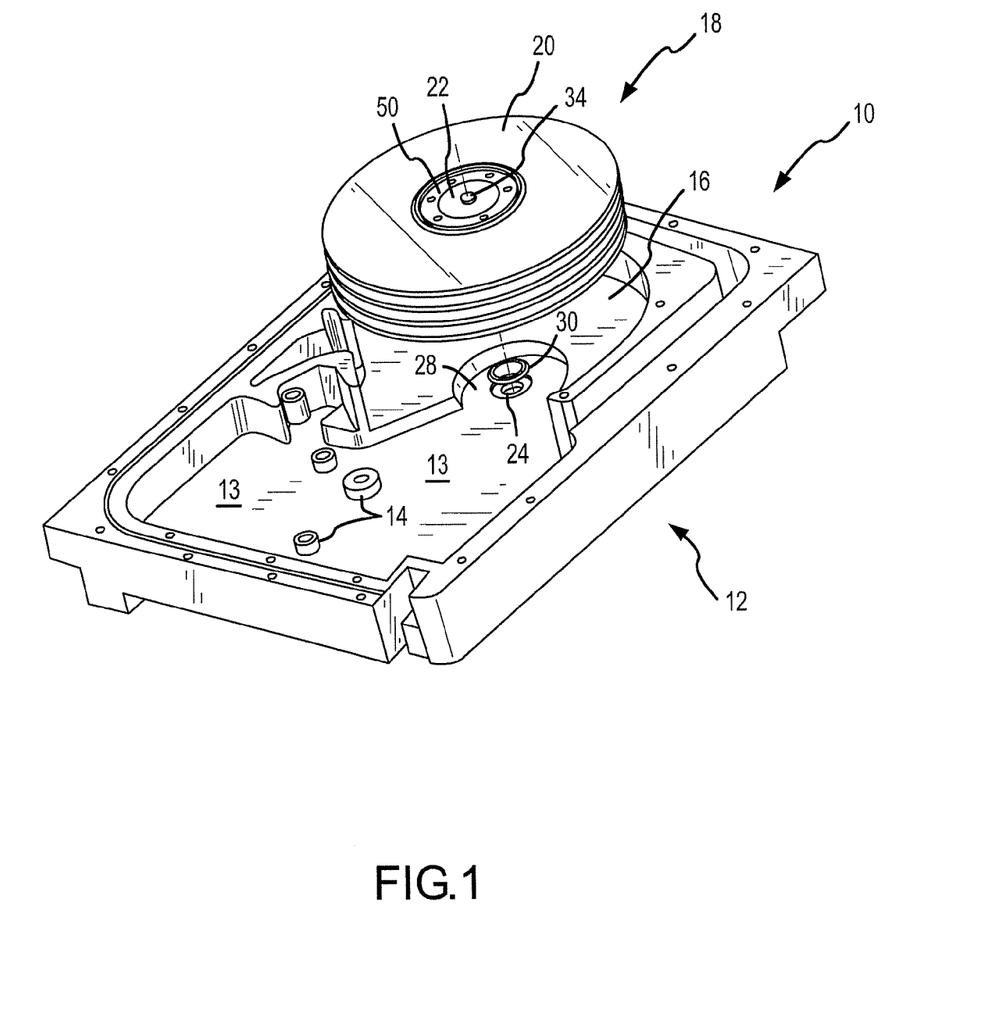
FIG. 1 is a perspective view illustrating a base plate of a disk drive housing, a disk pack aligned for installation within the base plate, and an opening in the base plate that receives the spindle motor shaft.

FIG. 1 illustrates one part of the housing assembly 10 of a disk drive, namely, the base plate 12. As shown, the base plate is a rectangular-shaped member having an interior portion thereof that forms a cavity 13 to house the components of the disk drive. Additionally, various protruding features 14 may be found within the cavity 13 of the base plate 12 to accommodate attachment of the components of the disk drive. One portion 16 of the cavity 13 includes an area to receive a disk pack 18. The disk pack 18 may include a plurality of data disks 20 stacked over a hub 22, and a disk clamp 50 (also see FIG. 5) is secured over an upper end of the hub 22.

Figure 2:
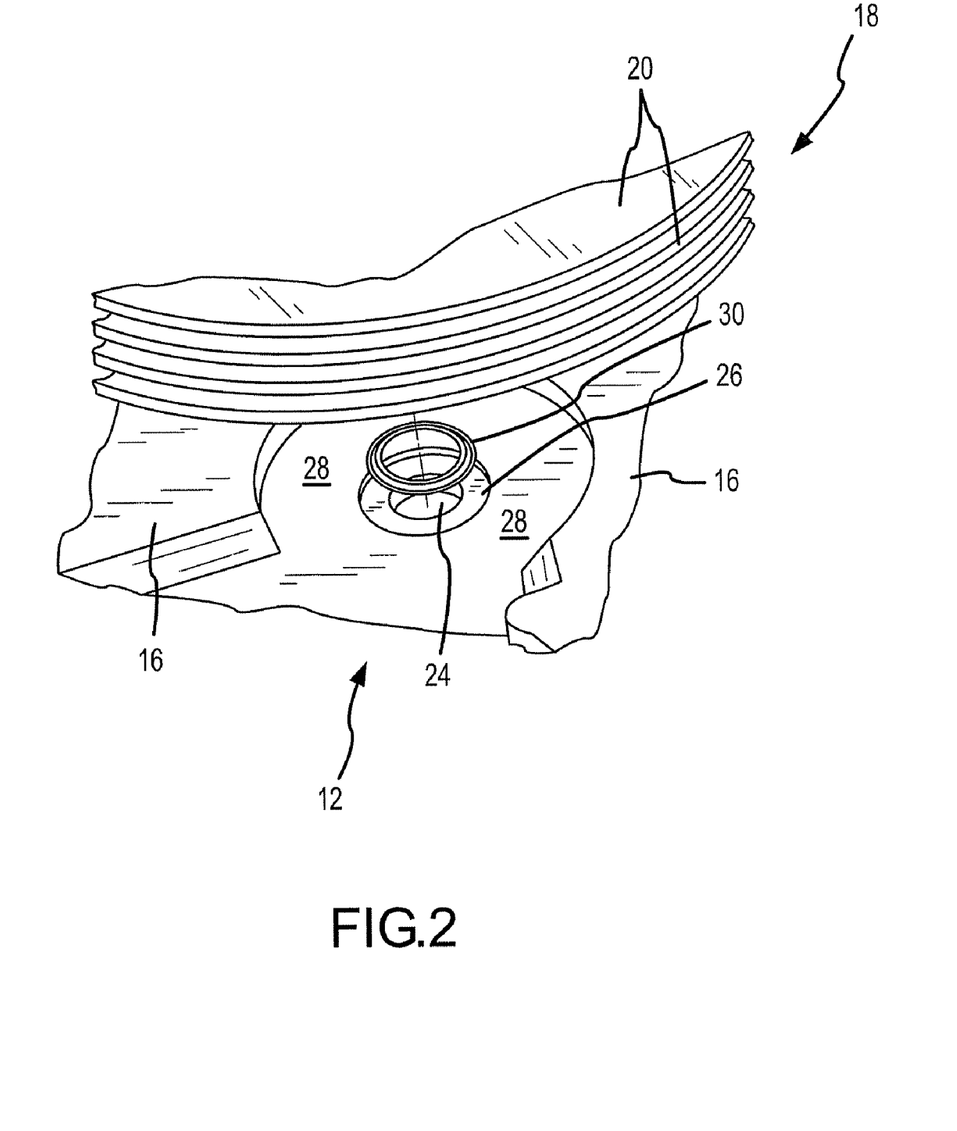
FIG. 2 is a greatly enlarged, fragmentary perspective view of the opening in the base plate to include the metallic sealing gasket.
Figure 3:
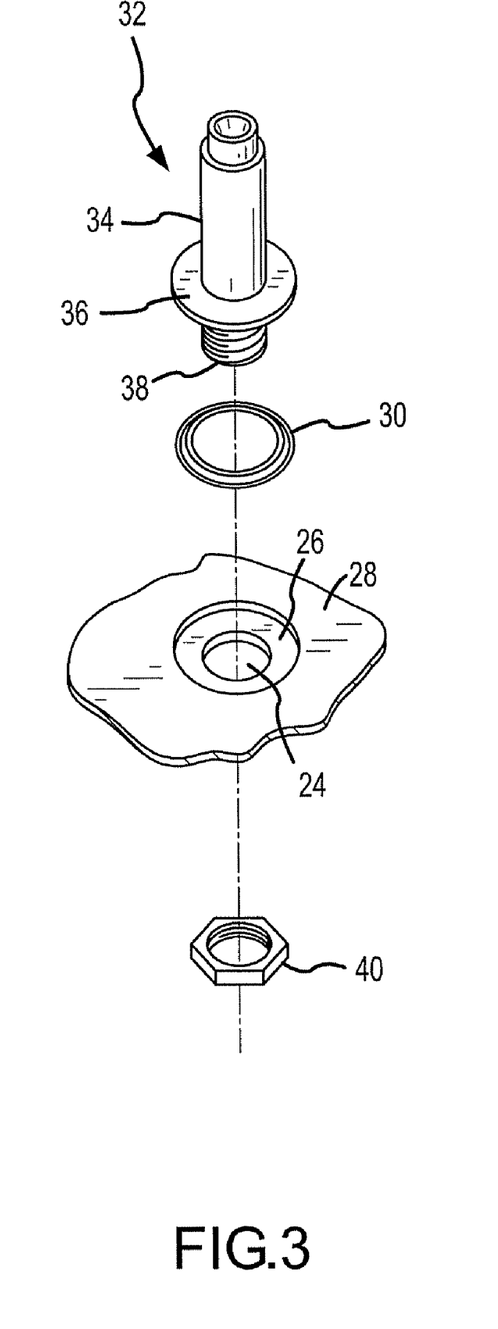
FIG. 3 is an exploded perspective view illustrating the components used to create the hermetic seal for the opening in the base plate.

As shown in FIG. 2, the base plate 12 may include an opening 24 that receives the spindle shaft 32 (FIG. 3). Directly adjacent the opening 24 and formed concentrically around the opening is a recess 26. The exposed surface of the cavity 13 around the recess 26 is shown as surface 28.

Referring specifically to FIG. 3, the exploded perspective view there shows the mechanical components which form the hermetic seal. A metallic sealing gasket 30 is disposed between the recess 26 and the flange 36 of the spindle shaft 32. Specifically, the spindle shaft 32 is shown as having an upper portion 34, the flange 36, and a lower threaded portion 38. A nut 40 is used to fix the spindle shaft 32 to the base plate, and to also compress the sealing gasket 30.

Figure 4:
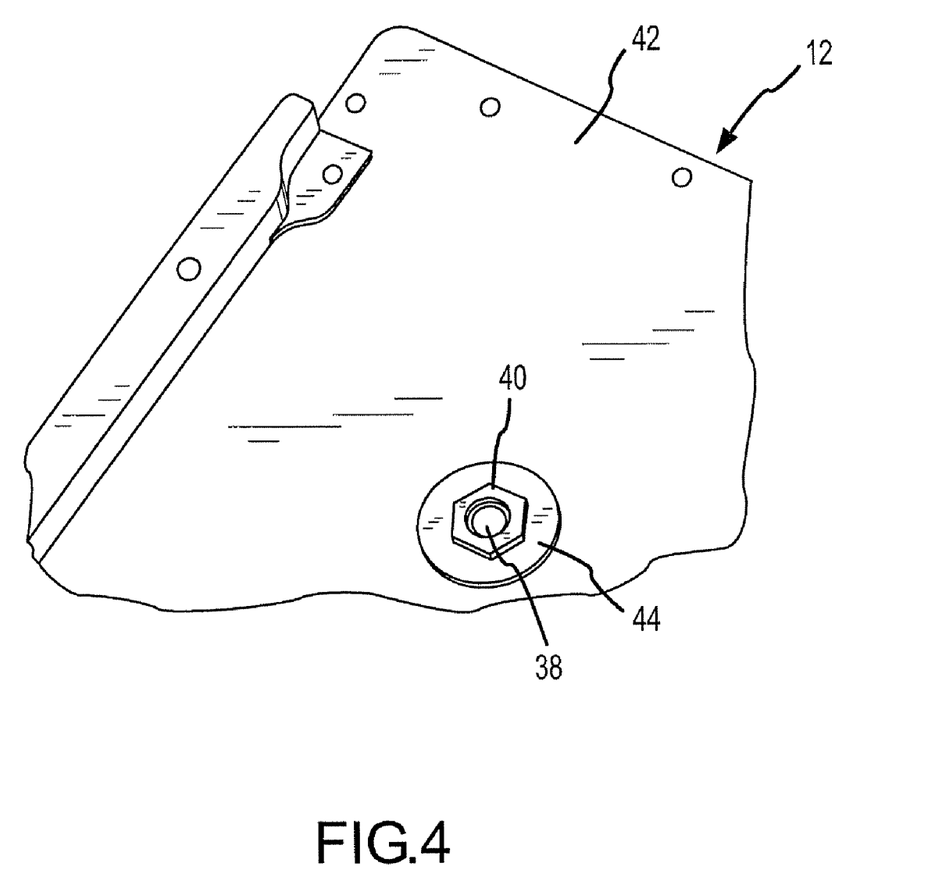
FIG. 4 is a fragmentary perspective view illustrating a lower surface of the base plate and illustrating a nut secured to the threaded end of the spindle shaft.

FIG. 4 illustrates a perspective view of the lower surface 42 of the base plate 12. As shown, the lower surface 42 may include a raised portion 44 that concentrically surrounds the opening 24. Nut 40 receives the threaded end 38 of the spindle shaft 32 that protrudes through the opening.

Figure 5:
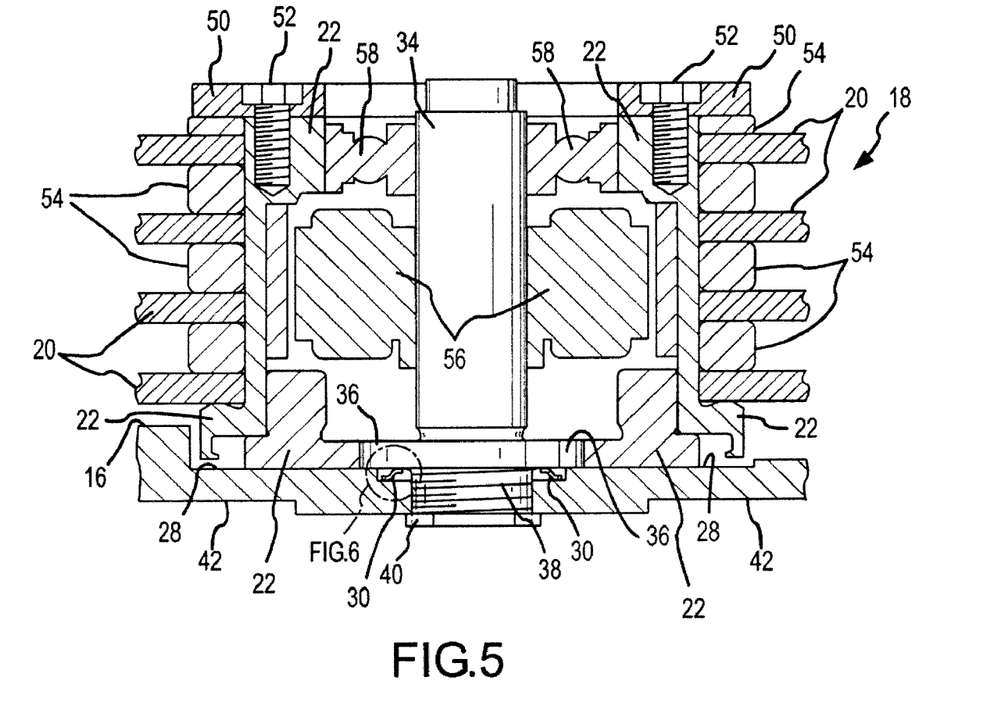
FIG. 5 is a vertical cross-section taken through the base plate and disk pack when installed, and particularly showing the arrangements of the elements that provide the hermetic seal.
Figure 6:
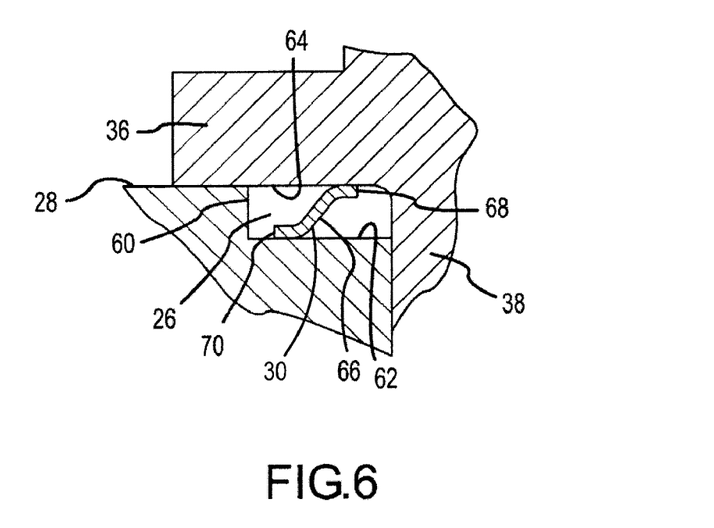
FIG. 6 is a greatly enlarged portion of FIG. 5 illustrating the configuration of the metallic seal as it is installed between a pair of planar-spaced contacting surfaces, these contacting surfaces in the preferred embodiment including a lower surface of a flange of the spindle shaft and a recess formed in an upper surface of the base plate.

Referring to FIGS. 5 and 6, further details of the disk pack are shown, as well as the particular arrangement of the sealing gasket 30. With respect to the disk pack, FIG. 5 is intended to illustrate a conventional disk pack wherein a plurality of data disks 20 are separated from one another by a plurality of spacers 54. The disk clamp 50 is secured to the upper end of the hub 22 as by screws 52. Various interior details of the hub assembly are shown to include the spindle motor, generally indicated at reference number 56, as well as the bearings, generally shown at reference number 58.

Referring specifically to FIG. 6, the particular arrangement of the sealing gasket is shown that provides the hermetic seal. The recess 26 comprises a side wall 60 and an exposed planar surface 62. The lower facing surface 64 of the spindle flange 36 is also planar, and extends substantially parallel with the surface 62. The sealing gasket 30 includes a frusto-conical mid-section 66, a lower linear portion 70 connecting to one end of the mid-section 66, and an upper linear portion 68 that connects to the opposite end of the mid-section 66. The lower linear portion 70 has a lower surface that makes flush contact with the lower planar surface 62, while the upper linear portion 68 has an upper surface that makes flush contact with the lower facing surface 64. When the nut 40 is tightened, the lower facing surface 64 of the spindle flange makes contact with surface 28 of the base plate, and compresses the sealing gasket 30. The compression of the gasket, as mentioned above, results in deformation of the seal such that a contact annulus is established having a purely compressive load, causing the soft elemental tin plating to deform and flow into the microscopic voids that may be present in surfaces 64 and 62, in contact with linear portions 68 and 70, respectively.

Although the soft plating may deform and flow as described, the deformation and flow is not destructive in that the plating remains attached to the underlying substrate material of the sealing gasket, which is preferably a stainless steel. If the nut 40 is loosened, at least some of the displaced plating does not remain displaced and will flow back to its original position. Thus, the tightening of the nut does not result in an irreversible deformation and flow of the tin plating. Accordingly, if re-work of the drive is necessary, the nut 40 can be removed, and the drive may be re-sealed by simply re-tightening the nut.

Although the sealing gasket of the present invention has been shown to seal an opening in the base plate of the disk drive, it should be understood that the same principle may be applied for sealing an opening in the top cover of the disk drive. Incorporation of a recess having an exposed planar surface that is disposed parallel with a planar surface of a disk drive component along with a sealing gasket placed therebetween can provide an effective hermetic seal.

In accordance with another aspect of the present invention, combining the hermetic seal with a process of sealing the disk drive housing itself is provided. The process may be used for base plates and cover plates made by a casting process. The casting process results in components having voids or porous grain structure in the material. The size of the pores will vary depending upon the casting process. The size of the pores may be referred to as the porosity of the material. Although the process is described in association with aluminum casting components, it should be appreciated that the process would work with components made from other materials such as steel, zinc and magnesium.

As a threshold step, it is preferable that the disk drive housing components be created from a process which minimizes porosity within the components. For example, base plates and covers are typically made by a casting process using aluminum. Castings which meet the American Society of Testing and Methods (ASTM) E505, Category A, provide suitable low porosity components. Such castings have porosity in external part surfaces which does not exceed 0.127 millimeters in diameter. Internal pores may be larger. A desired level of porosity which does not exceed 0.127 millimeters in diameter may be achieved using chill block cooling or vacuum-assist methodology for die casting for type A380 or 383 aluminum.

Following creation of low porosity components, in a second step of the process the castings are subject to stress relief. Stress relief is achieved by heating the components. One exemplary process would subject the components to a temperature of 232° C. for four hours.

Following stress relief, the castings may be radially aligned in a device to hold the castings referred to as a fixture. The fixture may be placed in a metal basket of similar cylindrical dimensions for ease in handling, transportation and processing.

The castings are next subjected to a cleaning and degreasing process. The cleaning and degreasing process generally comprises a multi-step process where the components are subject to detergent wash and rinse cycles. The objective is to remove silicon and organics from the components.

Next, one or more baskets of castings may be placed in a variable pressure chamber such as an autoclave. A vacuum is created in the autoclave placing the internal absolute pressure to between 3 to 8 millibars. This removes air from the chamber, including air within the exposed voids on the surface of the component castings. A sealant, such as a methacrylate sealing resin, and a catalyst, such as mikrofine AZDN, are then transferred into the autoclave from a storage tank to a level in which the castings are submersed within the sealant. The catalyst and sealant are preferably maintained in the storage tanks at a temperature of between 15 and 20° C. by a cooling unit. Due to the nature of these chemicals, the lower temperature prevents the sealant from gelling or solidifying.

The submersed castings are maintained at the vacuum pressure for approximately ten minutes to twenty minutes. A valve on the autoclave is then opened to allow the chamber to return to atmospheric pressure. Within a few seconds of opening the valve, the change in pressure forces sealant into the exposed pores of the casting. The condition is maintained for an optimum time period. One known optimum time period is approximately two minutes. The sealant and catalyst solution are then returned to its storage tank and the basket containing the castings is removed from the autoclave.

The baskets containing the castings are then placed in a centrifuge. The baskets may be rotated in a clockwise direction for two minutes and then in a counterclockwise direction for two minutes. The purpose of rotating is to remove excess sealer and catalyst solution. The centrifuge process step lasts approximately five minutes.

The castings are then subject to a cleaning process. For example, the baskets may be transferred from the centrifuge to a dunk tank containing deionized water at room temperature. The basket containing the castings reciprocates in an up and down motion to remove sealer. Air agitation may also be added to the water. The basket is then placed in a second tank and subjected to a static wash where jets of water are directed against the castings to further remove surface sealer. This overall cleaning step lasts for approximately four minutes. The baskets containing the castings are next transferred to a rotary wash tank. The baskets rotate about a horizontal axis for approximately four minutes in one direction and for approximately four minutes in the opposite direction. The cleaning solutions from the dunk tank, static wash and rotary wash may be removed after one or more uses.

The castings are then subject to a curing step. More particularly, the castings are submersed in hot water bath and preferably, the temperature is maintained between 87 and 93° C. for approximately ten minutes. The hot bath cures the sealer within the pores of the components.

Next, the baskets containing the components are then placed in a vacuum dryer. Hot air is forced across the castings, further curing and drying the castings. Preferably, the environment in the vacuum dryer is maintained at less than 40 millibars absolute pressure for approximately twenty minutes at about 45° C.

Next, an epoxy coating is applied to the castings. This is accomplished by first subjecting the casting to an acid wash and then an electronic deposition process. The acid wash comprises a cleaning cycle followed by subjecting the components to an acid bath. The acid bath prepares the surface to receive the epoxy. The types of acids used are phosphoric and nitric acid.

The deposition process preferably comprises electron deposition of the epoxy onto the surface of the castings.

The casting is then baked at a temperature of approximately 230° C. to cure the epoxy coating.

The castings are then subjected to final machining to meet final dimensions. As part of the machining process, some epoxy and sealer is removed and/or additional pores may be partially exposed. To impregnate the castings twice, the castings are again subjected to another round of adding sealing resin by use of the variable pressure chamber, cleaning, curing, and drying.

The twice-impregnated castings are subjected then to a final cleaning similar to the initial cleaning, and are subject to a final curing process. The final curing process preferably includes baking the sealed casting for approximately two hours at 200° C. This process additionally cures the sealer as well as out gases impurities.

The foregoing discussion of the invention has been presented for purposes of illustration and description. The foregoing is not intended to limit the invention to the form or forms disclosed herein. In the foregoing detailed description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this detailed description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus comprising:
    a base plate adapted to form a housing of a data storage device and having a first planar surface which concentrically surrounds an opening extending through the plate;
    a component extending through said opening and having a second planar surface facing said first planar surface;
    a plated sealing gasket compressed between said first and second planar surfaces, said gasket having a first linear portion that abuts said first planar surface, a second linear portion that abuts said second planar surface in a non-radially overlapping relation to the first linear portion, and a linear frusto-conical portion that respectively projects from the respective first and second linear portions at a common obtuse angle,
    a nut secured to an end of said component extending through said opening, said end being threaded for engagement with said nut.

2. An apparatus, as claimed in claim 1, wherein the plated sealing gasket comprises a metal plating adapted to fill voids in the respective first and second planar surfaces responsive to compression of the gasket between the first and second planar surfaces.

3. An apparatus, as claimed in claim 1, wherein said sealing gasket has an S-shaped cross-section.

4. An apparatus, as claimed in claim 1, wherein said component comprises a spindle motor shaft.

5. An apparatus, as claimed in claim 1, wherein the plated sealing gasket is plated with a layer of elemental tin.

6. The apparatus of claim 1, wherein the linear frusto-conical portion changes angles with respect to the first and second planar surfaces in response to mechanical compression of the sealing gasket.

7. An apparatus comprising:
- a base plate adapted to form a housing of a data storage device and having a first planar surface which concentrically surrounds an opening extending through the plate;
- a component extending through said opening and having a second planar surface facing said first planar surface;
- a plated sealing gasket compressed between said first and second planar surfaces, said gasket having a first linear portion that abuts said first planar surface, a second linear portion that abuts said second planar surface in a non-radially overlapping relation to the first linear portion, and a linear frusto-conical portion that respectively projects from the respective first and second linear portions at a common obtuse angle, wherein the base plate further comprises a limit surface, the second planar surface contactingly abutting the limit surface to limit overall compression of the sealing gasket.

8. The apparatus of claim 7, wherein the first linear portion contacts the first planar surface along a first annular zone, and the second linear portion contacts the second planar surface along a second annular zone radially offset in non-overlapping relation to the first annular zone with respect to a central axis of the component.

9. The apparatus of claim 7, wherein the base plate is impregnated with resin to reduce gas permeability of the base plate.

10. The apparatus of claim 7, further comprising a cover member connected to said base plate to form a hermetically sealed housing which encloses a low density gas atmosphere.

* * * * *